V. BERNOVITS.
MACHINE FOR THE CALCULATION OF INTEREST AND SIMILAR VALUES.
APPLICATION FILED MAR. 7, 1912.
1,145,179.
Patented July 6, 1915.
6 SHEETS—SHEET 3.
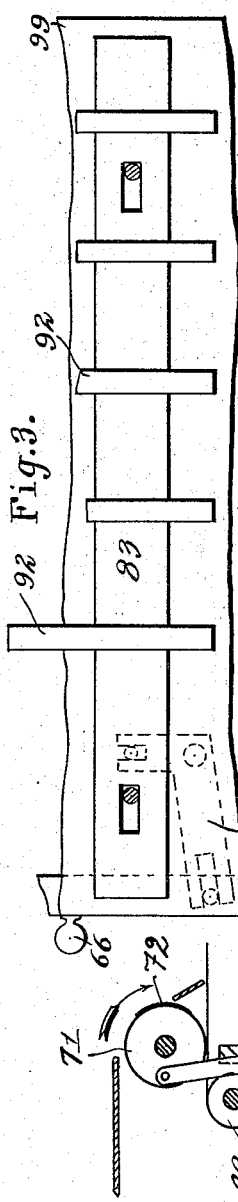
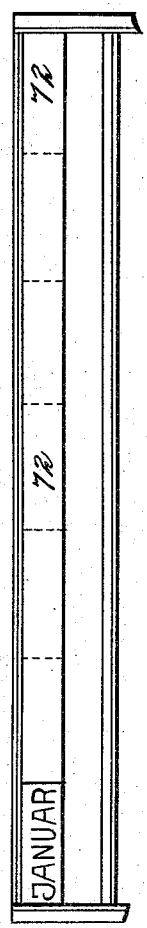
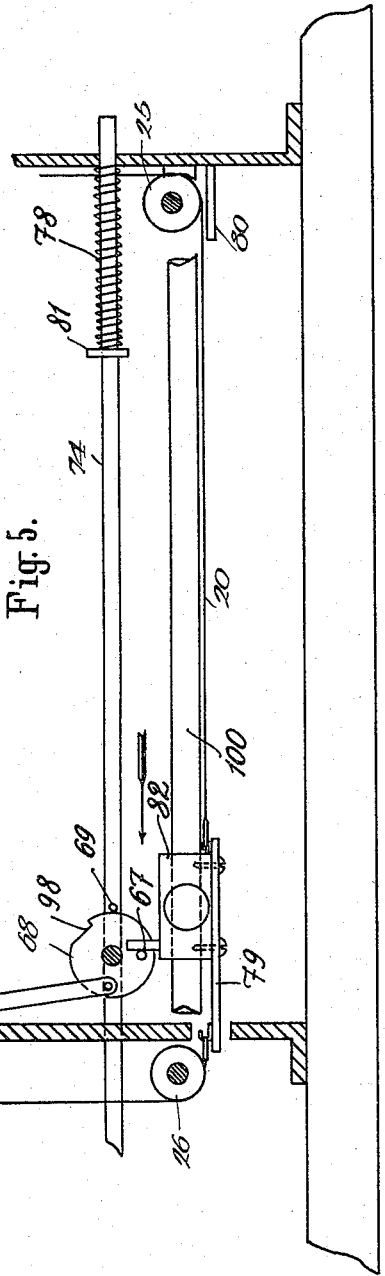
Witnesses.
Inventor:
Victor Bernovits
Attorneys

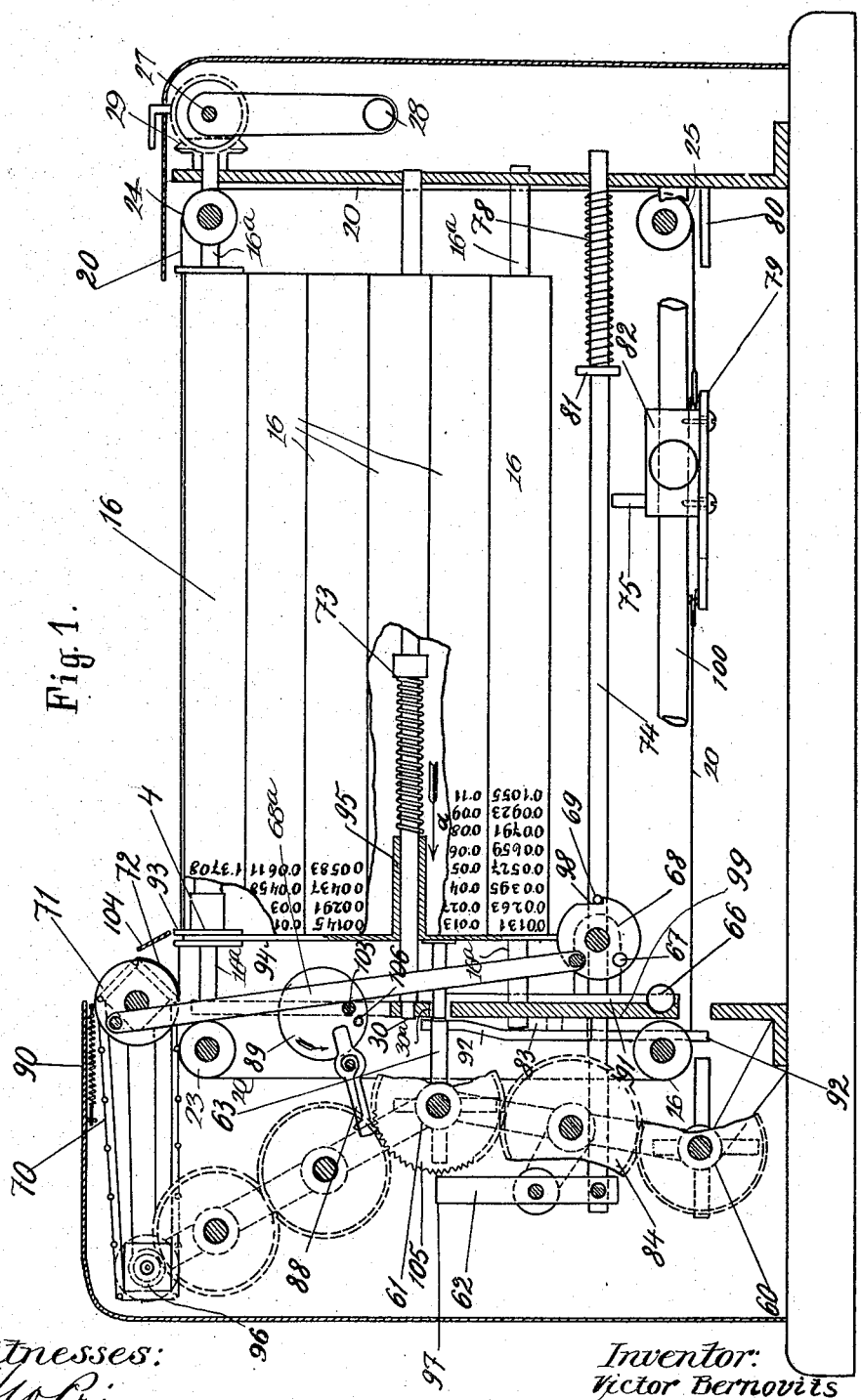

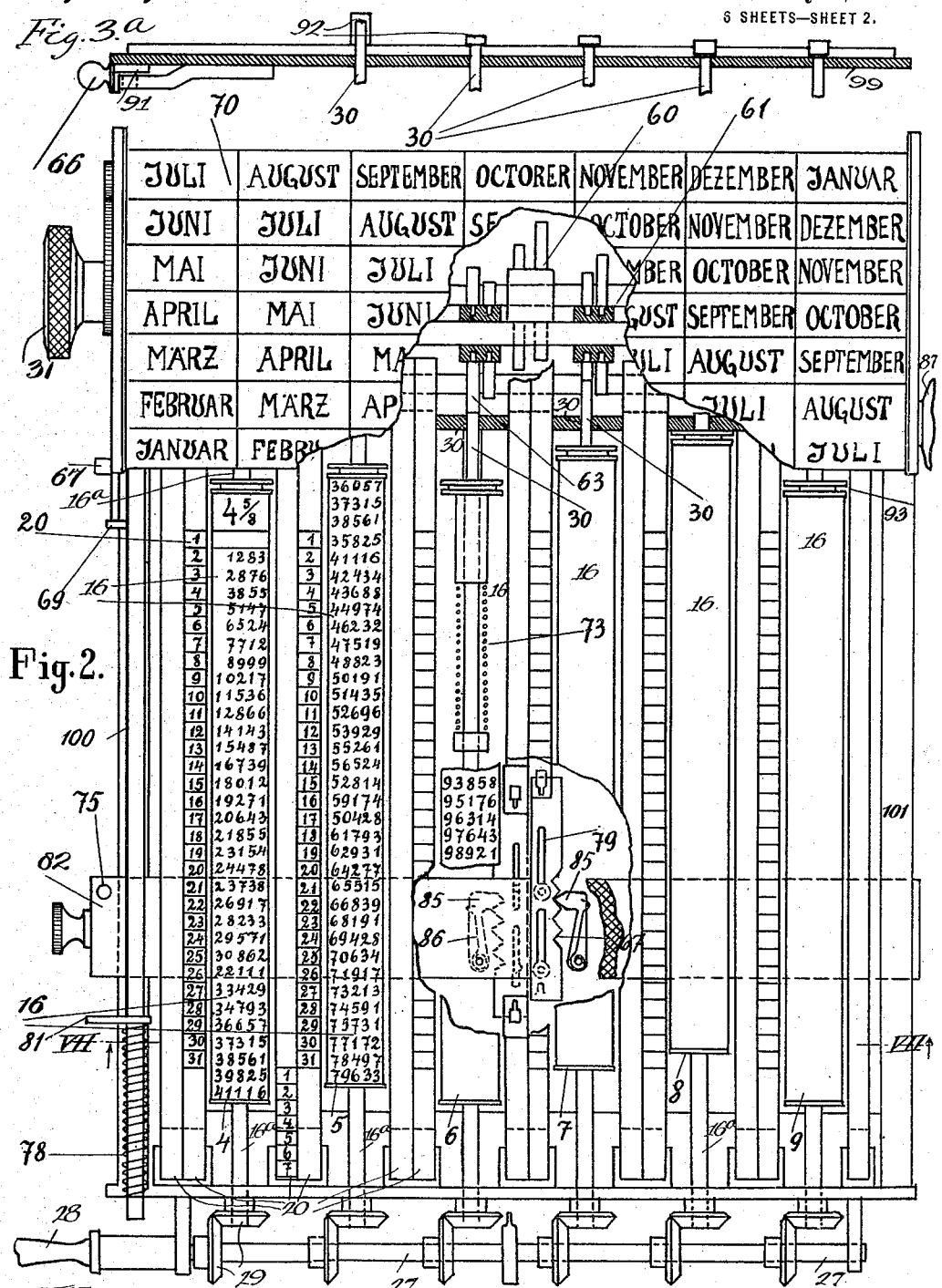

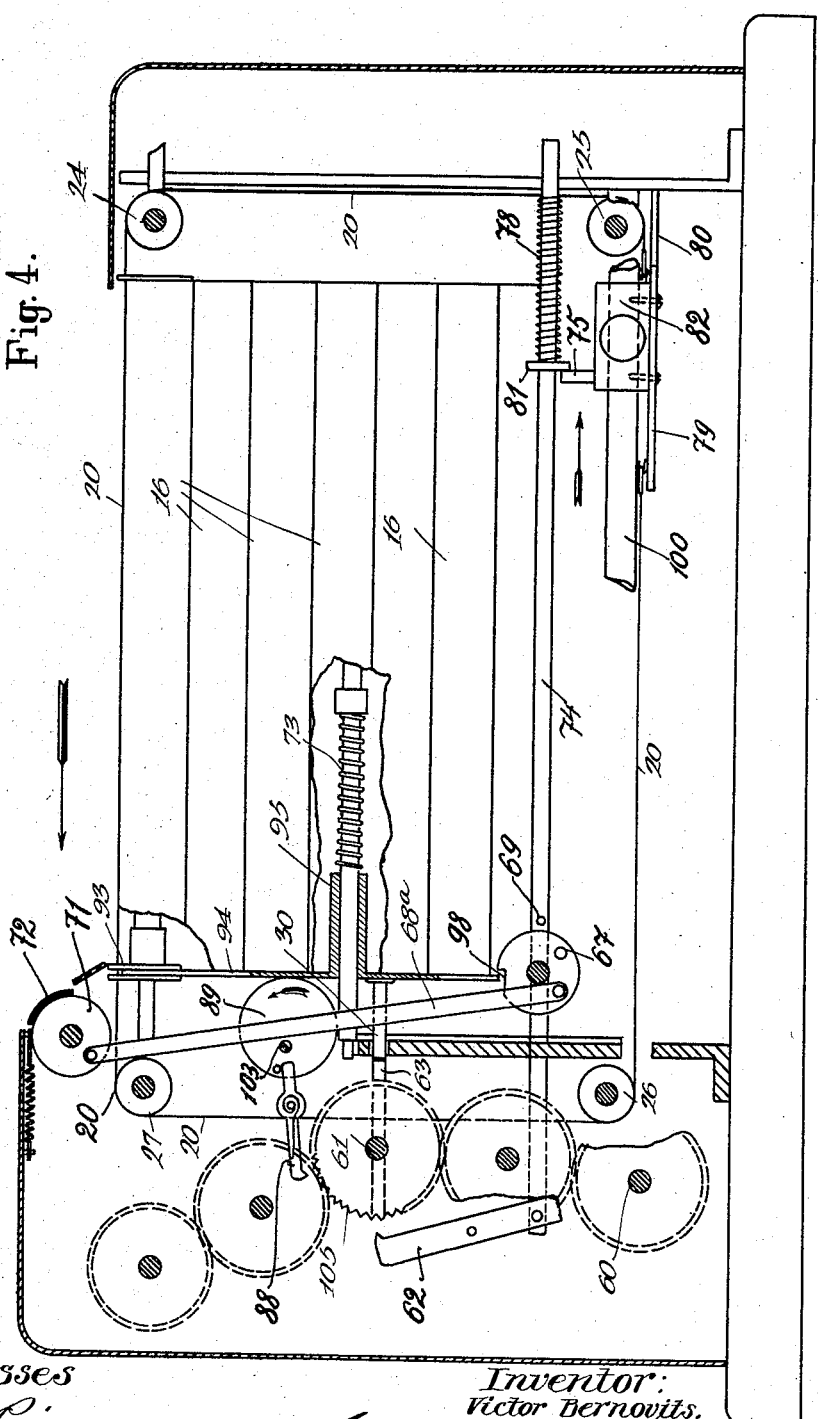

V. BERNOVITS.
MACHINE FOR THE CALCULATION OF INTEREST AND SIMILAR VALUES.
APPLICATION FILED MAR. 7, 1912.
1,145,179.
Patented July 6, 1915.
6 SHEETS—SHEET 5.
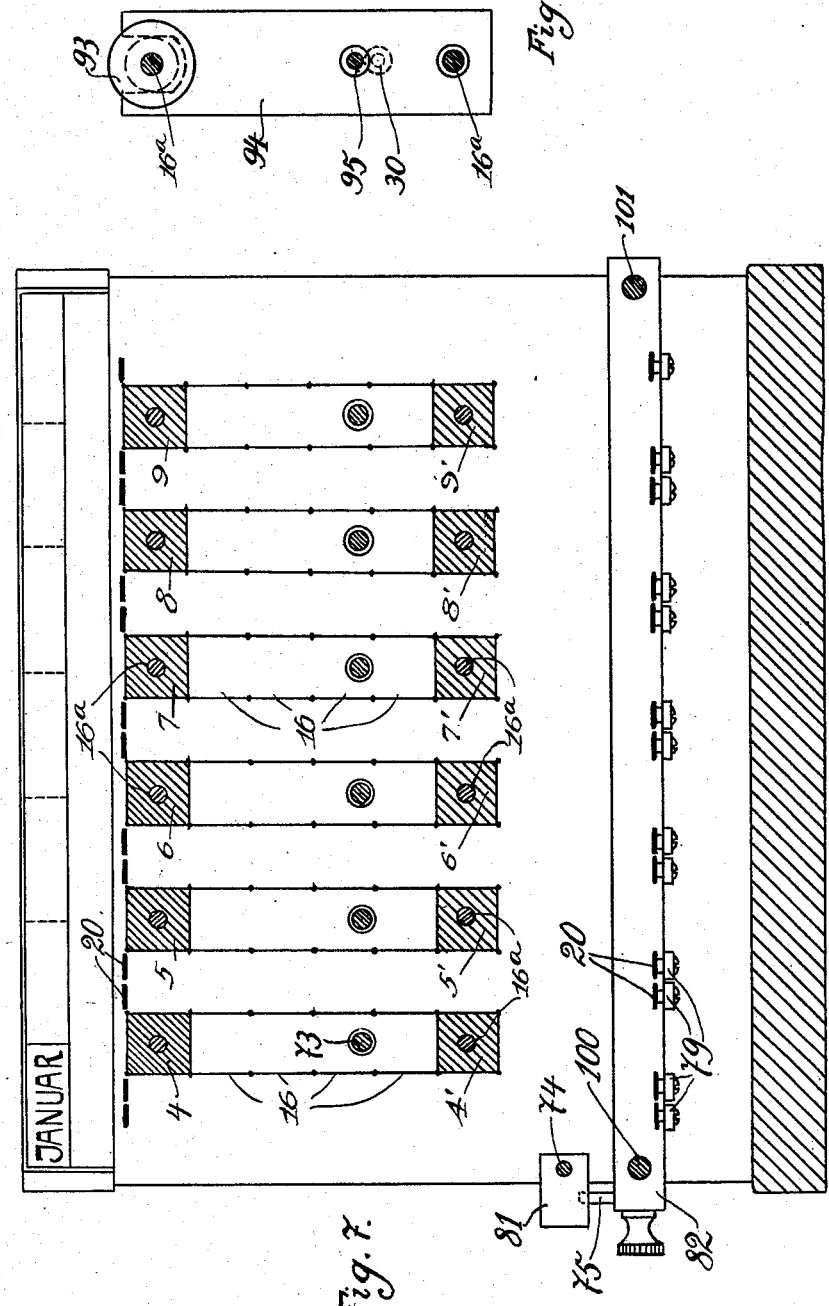

V. BERNOVITS.
MACHINE FOR THE CALCULATION OF INTEREST AND SIMILAR VALUES.
APPLICATION FILED MAR. 7, 1912.
1,145,179. Patented July 6, 1915.
6 SHEETS—SHEET 6.
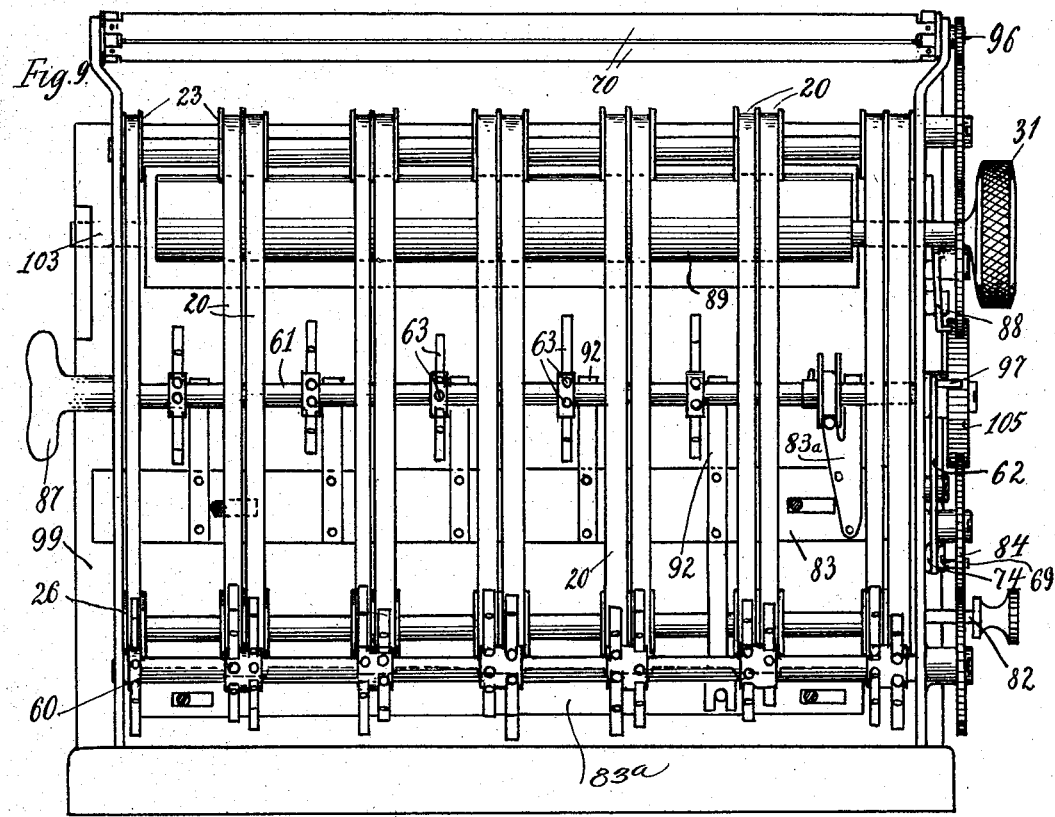
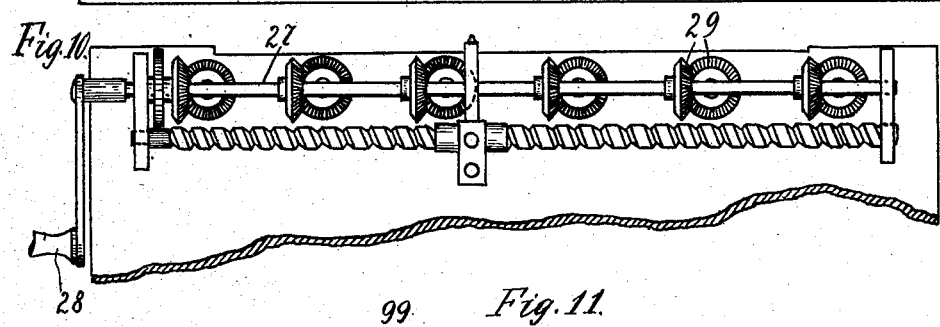
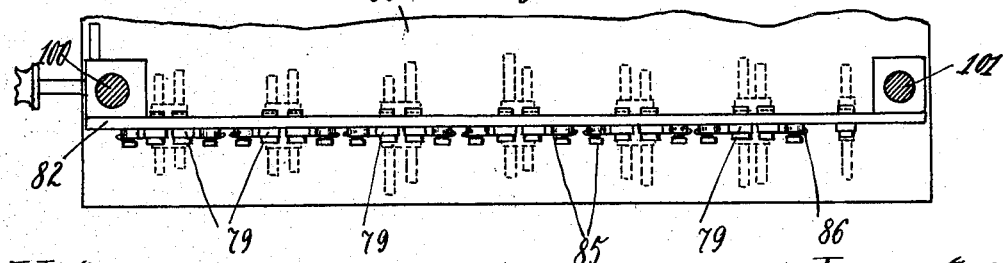

UNITED STATES PATENT OFFICE.

VICTOR BERNOVITS, OF KASSA, AUSTRIA-HUNGARY, ASSIGNOR TO "PROCENTO" HUNGARIAN RECKONING MACHINE AND TYPEWRITER COMPANY LIMITED, OF KASSA, AUSTRIA-HUNGARY, A CORPORATION OF HUNGARY.

MACHINE FOR THE CALCULATION OF INTEREST AND SIMILAR VALUES.

1,145,179.      Specification of Letters Patent.      Patented July 6, 1915.

Application filed March 7, 1912. Serial No. 682,245.

*To all whom it may concern:*

Be it known that I, VICTOR BERNOVITS, managing director, a subject of the King of Hungary, and residing at Kassa, in the Kingdom of Hungary, in the Austro-Hungarian Monarchy, have invented certain new and useful Improvements in Machines for the Calculation of Interest and Similar Values, of which the following is a specification.

This invention relates to a machine for calculating interest, whereby interest is calculated for a number of months and fractional parts of a month, at varying rates of interest. The interest calculated by the machine is the interest on a convenient standard unit, a cent, a dollar, a franc, or as designated in the interest tables of this machine, a heller. That is, the interest for this unit at the given rate and for the given time, is read off at the proper place on the interest tables, and this interest is multiplied by the number of these units in the principal to find the interest on the principal for the given time and rate.

The object of the invention is to provide a machine that will calculate the interest on a standard unit value, at various rates of interest over a number of months, a number of days, or a number of months and days, such calculation being based on the actual number of days, 28 to 31, in the several months involved, or on the commonly used period, 30 days.

The invention resides in the construction and arrangement of parts whereby the various adjustments for the different rates of interest, the different months involved, and the different number of days in each month, are automatically effected.

For each rate of interest, there is provided an interest table, bearing numerals thereon showing successive increments of interest on the standard unit, on successive days. The range, that is, the number of days covered by each of these tables, may be, for example, three months, six months, or a year. In the machine here described, the range is six months, in which case the table is divided up into six sections, one for each of the months. It is evident, then, that interest may be read off on these tables, starting at the head of the left table, reading downward to the foot, then moving to the head of the next table and the right, reading downward, and so on.

In the drawing, a construction of the invention is illustrated as follows:—

Figure 1 shows the side elevation partly in vertical section. Fig. 2 a view from above partly broken. Fig. 3 separate parts of another construction. Fig. 3ª is a longitudinal section of Fig. 3. Fig. 4 shows a side elevation of the vertical section similar to Fig. 1 but with the slides drawn back for the release of the lock and the zero adjustment of the longitudinal strips for the days. Fig. 5 shows a view with the slides brought forward for the adjustment of the longitudinal bands corresponding to the adjusting months. Fig. 6 illustrates the blind in the raised position. Fig. 7 is a cross section along the line VII—VII of Fig. 2 showing the two rotary prisms for each month and the strips around them, looking in the direction of the arrows. Fig. 8 is a view of a vertical crossbar with a fork at the upper end for the lateral adjustment of the two rotary prisms of each month. Fig. 9 is a view of the machine, looking from the left in Fig. 1. Fig. 10 a view of the upper fore part of the machine and Fig. 11 is a front view of the lower part of the rear end of the machine.

The interest tables 16 are mounted one beside another on a suitable carrier, in the form of an endless belt. Any given belt consists of interest tables, each showing successive increments of interest at a certain rate. These six belts are mounted on rotary prisms, 4 to 9 and 4' to 9'. See Figs. 2 and 7. These prisms are mounted on rotable shafts 16ª journaled in the casing. The tables are so mounted on their respective belts that when a given series of tables are uppermost, as shown in Fig. 2, that series of tables shows successive increments of interest at the same rate, 4⅝% in this case. At the one end each prismatic body has provided a disk 93 possessing a groove, in each of which grooves a series of bifurcated cross bars 94 engage like a fork. On each crossbar 94 there is a projection 30 that slides back and forth in the aperture 30ª of the casing. The prismatic bodies form with the series of vertical bars 94, a frame for mounting the interest tables, that can now be displaced along their axles 16ª longitudinally and each set of them stands under the control of a spring 73, which acts upon a sleeve 95 on the crossbar 94, in order to move the sleeve and the attached two prismatic bodies in the direction of the arrow *a* (Fig. 1).

For every particular calculation the displacement of the rotary prisms must correspond to the number of the days of the corresponding months involved. Each strip of the bands 16 except the one on the extreme left of Fig. 2, has 34 consecutive numbers of the interest table. 34 numbers of the table are carried by the remaining prism for this reason:—Each table must, of course, be able to represent any month, and therefore must carry at least 31 numbers. Now since February has but 28 days, the numbers corresponding to 29, 30 and 31 for a 31 day month would be considered with that month, are in the case of February, considered with the following month, March; that is, the last three numbers on the February table must be repeated at the head of the March table. The March table already has a minimum of 31, and these 3 more, make 34. Any one of the tables must be able to be used to represent March, therefore each one must carry at least 34 numerals designating successive increments of interest, in which case, the last three numerals on the one strip are repeated at the head of the succeeding strip. While 34, then, is the minimum amount of numbers, it may be convenient to repeat, at the head of the succeeding table, more than three numbers. In Fig. 2, however, only the three numerals corresponding to 29, 30 and 31 are repeated at the head of the succeeding strip 5. The first number of the table of the first band on the rotary prism 4 is zero since the first day is not yet bearing interest. These table strips of the single bands are showing the consecutive interests of a unit value, for instance one heller from the second day of the first month as decimal fraction of nine characters, the last five significant figures of which are read off on the strip 16, four ciphers being inserted between the decimal point and these five figures to give the actual interest. Likewise the tables of the following bands 16 contain the interests of the consecutive months.

The automatic adjustment of the rotary prisms 4, 5, 6, 7, 8, 9 and the bands 16 is effected by the projection 30 on each cross piece 94 engaging with projections 63, which projections are fixed upon a revoluble shaft 61 which can be turned by means of gearing operated by a handle. The projections are of different lengths and serve to effect automatically the above-mentioned adjustment of the prismatic bodies according to the number of the days of the month to be calculated. For each strip 16 provided with the interest table there are provided upon the shaft 61 radially twelve similar projections 63 which differ in position by one to four divisions of the interest table corresponding to the difference of the days of the separate months (28 to 31.) (In Fig. 1 are only shown four projections 63.)

In order to be able to effect an axial adjustment of the prismatic bodies, these latter must firstly be removed to a certain distance from the projections 63 on the shaft 61, so that this latter can be revolved without hindrance. For this purpose there is provided the shaft 103 carrying an eccentric cylinder 89, which shaft when turned by means of a handle 87 (Fig. 2) at one side moves the crossbar 94 opposite to the direction of the arrow *a* overcoming the pressure of the spring 73. Instead of the eccentric there might also be used any other convenient device for the adjustment of the crossbar 94. If then, the shaft 103 be further turned so that the pressure of the eccentric 89 on the crossbar 94 relaxes, then the latter is pushed along by means of the springs 73 until the pins 30 strike against the adjusted projections on the shaft 61, whereby the adjustment of the prismatic body is effected corresponding to the requisite month. Corresponding to this axial displacement of the prisms and tables, there must be longitudinal displacement of the strips 20, which strips carry numerals from 1 to 31, for the days of the month. There are two of these longitudinal strips for each interest table, the two being located adjacent and substantially parallel to and on opposite sides of their respective table. These strips are movable longitudinally by being mounted on rollers 23, 24, 25 and 26, through means described below, in order to bring them into proper relation with the tables in the various adjusted positions thereof, and in order to bring the two members of each pair of strips in proper relation with one another, dependent upon the number of days in the particular month involved for that pair of strips. That is, if there are 28 days in the particular month involved, the numeral 1 on the right hand strip is placed horizontally across from the numeral 29 on the left hand strip; if 30 days, the numeral of the right hand strip is placed horizontally across from the 31 of the left hand strip.

A projection shaft 60 is provided which is formed in the same manner as the shaft 61 and is geared with the latter by gear wheels 84, so that the relationship between the projections on these two shafts 60 and 61 is always definite; that is, if one shaft is set for a given month, the other shaft, geared thereto, is likewise set for that month.

For the purpose of the relative displacement of the separate strips 20 there is provided under the lowermost prismatic rotary body a slide 82 movable in the longitudinal direction of the machine on side guides 100, 101. The strips or ribbons 20 are engaged at their ends each in the hooks of a short tooth rack 79, which racks are connected adjustably to the slide 82 and in such a manner that the racks can be moved in the longitudinal direction. In the tooth intervals of each tooth rack 79, the catches 85 can engage, being provided with springs 86; these catches are attached pivotally to the slide underneath whereby the adjustment of the tooth racks with regard to the slide is assured. The racks are all brought into the starting position by the slide 82 being moved to the right, so that each rack 79 contacts with the projection 80, and so is shoved to the starting position. They are set in their adjusted positions, according to the months involved, by being moved to the extreme left, so that the racks 79 engage with their respective projections on the shaft 60 and are shoved along a notch or two, or remain stationary, as the case may be. The extent of the relative movement of each rack, and consequently of each tape 20 is, at the most, only four notches of the rack, because the difference in the number of days in any two months is, at the most, only four, that is, from the 28-day month to the 31-day month.

Mounted on the prismatic shafts 96 and 71, journaled in the casing, is a sectional table 70, composed of strips extending horizontally across the machine, linked together to form an endless belt. These strips are inscribed with the names of the months, as shown in Fig. 2.

In a peephole arranged across above a crossbar 104 (Fig. 1) the names of the months appear one beside another, and in the first field appears the months from which the interest is to be calculated. Corresponding to the month which appears in the peephole, there must also be adjusted the projections of the shafts 60 and 61 according to the number of days of the consecutive months, and this is accomplished by connecting the three shafts 96, 61 and 60 by gearing, so that when a given month appears at the peephole, the limiting projections on shafts 60 and 61 will be properly set for that month.

The machine is provided with three locking devices, each of which must be unlocked before a calculation may be made. The three operations that actuate these unlocking devices simultaneously actuate mechanism for bringing the several parts of the machine into proper adjustment for the particular calculation. These three steps and the mechanism involved, will now be described in turn.

The first locking device consists of the lever 62, see Figs. 1 and 4, fulcrumed on the frame of the machine, and provided with a toothed head 97 that is adapted to engage with and lock the gear wheel 105 against rotation. This wheel 105 is rigidly mounted on the pin bearing shaft 61, and so will prevent rotation of that shaft if it is itself locked. The lower end of this lever 62 is pivoted on the end of a rod 74, that is movable back and forth in suitable apertures in the casing. This rod 74 has a stop 81 firmly fixed thereon. A helical spring 78 is interposed between this stop 81 and the casing, and presses the rod 74 to the left. The slide 82 carries a finger 75, so placed that when the slide 82 has been moved to the right and the toothed racks 79 moved to their starting position, by having been shoved by abutting against the stop 80, the finger 75 has contacted with the stop 81 and moved it to the right far enough to cause the toothed head 97 of the lever 62 to be disengaged from the gear wheel 105. Thus the first unlocking operation is completed, and the first adjustment, that of moving the racks 79, and consequently, the strips 20, to their starting position, is also completed; see Fig. 4.

The second unlocking device consists of the lever 88, fulcrumed on the frame, and provided with a toothed head adapted to engage with and lock the gear wheel 105 against rotation. The eccentric cylinder 89 carries thereon a pin 106, see Fig. 1, that is adapted to engage with the butt end of the lever 88 from the upper side to raise the toothed end of the lever out of engagement with the gear wheel 105. The handle 87, when turned to produce a rotation of the shaft 89 in the direction of the arrow, will rotate said shaft so that it contacts with the bars 94 and presses the whole series of bars, prisms and interest tables 16, to the right, to their starting position; that is, to the position shown in Fig. 4. By the time that the cylinder has gotten this far around, the pin 106 has pressed down on the lever 88, and caused its toothed end to release the wheel 105. Thus the second unlocking operation is completed, and the second adjustment, that of moving the tables 16 to their starting position, is also completed, as shown in Fig. 4. The blind 72, however, is still covering up all the months, except the one on the extreme left, in this case "Januar", see Figs. 4 and 6. The blind is held in this position by the retracting spring 90. The whole train of gears connecting shafts 96, 61 and 60 is now released. The handle 31 is now turned by the operator until the month at which the calculation is to begin appears at the extreme left of the blind 72, as shown in Fig. 6. By so doing, the proper succeeding months assume their respective position in regular order horizontally across behind the blind, and at the same time shaft 96 and pin bearing shafts 61 and 60 are turned into proper position, by their being geared together, for longitudinally adjusting the prisms 4—9, and for adjusting the toothed racks 79 for these months.

The third unlocking device consists in the means for releasing the blind 72, so as to uncover the rest of the months in order to be able to make a calculation. A disk 68, see Fig. 1, journaled on the frame of the machine is connected to the blind 72 by means of the long arm 68$^a$, so that when the disk is caused to oscillate back and forth through a small arc, the blind will cover and uncover the names of the months. The disk 68 carries a pin 67, that is adapted to be engaged by the finger 75 on the slide 82. The rod 74 carries a pin 69, adapted to engage the notch 98 in the disk 68. These parts operate as follows:—The slide 82 is moved over to the extreme left, as in Fig. 5, finger 75 moves the disk 68, which in turn rotates the blind 72 in the direction of the arrow, and so uncovers the names of the months succeeding the one from which the calculation of interest is to take place. Simultaneously with this, the racks 79 have engaged with their respective pins on the shaft 60 and have been pushed greater or less distances, according to the length of the several months involved determined by the lengths of the respective pins, and so each of the strips 20 is properly adjusted. Thus the third unlocking operation, that of uncovering the names of the months, is completed, and the third adjustment, that of setting the toothed racks and consequently the strips 20, for the respective months, is also completed.

The pin 69, after the disk 68 has been rotated as above described, engages with the notch 98 to hold the disk 68 in position, as shown in Fig. 1, and consequently to keep the blind 72 in the uncovering position. As soon as the first unlocking operation is carried out, as above described, preparatory to another calculation, the rod 74 is moved to the left, pin 69 releases the disk 68, and the retracting spring draws back the blind 72 to the position to cover up all the months except the one on the extreme left, and so it is evident that each of the three above mentioned steps must be taken for each calculation.

For calculating the interest one proceeds in the following manner. Supposing that the interest of 4000 Kr. shall be calculated for instance from the 1st July up to the 25th August at a percentage of 4⅜%. If now the machine is adjusted to July with the first prism and the other three unlocking measures are taken one after the other in the manner as described in the preceding part of the specification, it is necessary to bring that table strip upon the upper side of the upper prisms which corresponds to the percentage of 4⅜%. This is done by turning the shaft 27 by means of the handle 28 whereby by means of the bevel wheels 29 all prisms are turned at the same time. Thus the adjustment to the desired percentage is made, which appears at the upper part of the first prism. If now the adjustment of the 4⅜% has taken place one must take care that by displacement of the slide 82 that day of the left strip 20 from which the interest calculation is to begin is put to the first place of the interest table not inscribed with a number. In the present case the interest calculation begins with the 1st of July; the 1 therefore of the left strip 20 indicating the days has its position at the side of the first line of the interest table. The numeral 1 of the left hand strip 20 for August should be set opposite the number immediately following the number corresponding to the last day of July. Since July has 31 days, the number 31 of the last day has its position for instance opposite to the number 38561 of the interest table. The next number will be 39825 and this number has its position opposite to the number 1 of the first day of the following month (August). It is necessary, therefore, that the consecutive prisms be adjusted corresponding to the consecutive months for which the calculation is to be performed. As already mentioned, this adjustment takes place automatically by the projections 63 of the shaft 61.

Since the calculation is to run up to the 25th August one must seek the number of the interest table corresponding to this day. That is the number 70634 from which 9 decimals must be separated off. The number obtained thereby is 0.000070634. This number represents the interests of a "heller" from the 1st July up to the 25th August. The interests of 4000 kr. are, therefore 0.000070634×400000=28.25 kr. If now for instance 4⅜% interest of any amount beginning from another day of July is to be calculated, for instance, beginning from the 12th of July, by displacement of the slide 82 the 12 of July is brought to the place where now the 1 is. In the same manner, however, the other longitudinal strips 20 for the days of the months are advanced for twelve places. The 25 of the month August therefore will be 12 places higher, namely, where now the 13th of this month has its place. The calculation therefore would begin from the 12th July. In the same manner all other days of the strips for the single month would be displaced upward for 12 places too. That is, if the calculation is to begin on July 12 and end on August 25, the left hand strip of table 4 is moved up 12 places by moving slide 82 to the right of Fig. 1, which simultaneously moves the numeral 25 on the left hand strip 20 for table 5 up 12 places, and the interest read off opposite said numeral 25, on the table 5.

As it is necessary with this machine to calculate not only interest for the calendar days (the months being reckoned at 28, 30 or 31 days) but also for the months of 30 days, the pins on the shafts 61 and 60 are arranged double (Fig. 2). They can be displaced longitudinally so that according to requirement the one or the other group of pins of the pin rollers comes to stand in front of the corresponding projections 30. These second pins are made of such a length that by means thereof all the prismatic bodies as well as the strips for the days are adjusted so as to cause all the months to show equally thirty days only.

It may occur that in consequence of want of space double pins for the two methods of reckoning cannot be fixed to the shafts 60, 61. In this case two slides 83 and 83ª, see Fig. 9 (for prisms and strips respectively) are provided in the plate 99 of the machine, which slides have projections 92 to engage with the parts 30, for the purpose of bringing the prismatic bodies into a position which corresponds to the count of thirty days for each month. (Fig. 3). The displacement of each slide 83 and 83ª is effected by the moving of a slide 91 with head 66, the slide 83 being moved by means of the lever 84; as shown in Fig. 3.

Attached to the slide 83, at the right, is the upwardly extending arm 83ᵇ, which arm engages loosely with the shaft 61. The purpose of this arm is to reciprocate the shaft 61 back and forth, according as the slide 83 is reciprocated back and forth; the reciprocation of the slide 83, then, moves the pins 63 into and out of operative position and at the same time moves the stops 92 out of and into position, respectively.

Having thus described my invention, what I claim and desire to secure by Letters Patent is:

1. In a machine of the character described, the combination of a series of endless belts, a corresponding series of longitudinally adjustable frames for mounting said belts, each of said frames carrying rotatable mounting means for said belts, each of said endless belts being composed of a plurality of strips, each strip bearing characters showing successive increments of interest on successive days, and means for automatically adjusting said frames different distances longitudinally corresponding to the different months involved.

2. In a machine of the character described, the combination of a series of endless belts, a corresponding series of longitudinally adjustable frames for mounting said belts, each of said frames carrying rotatable mounting means for said belts, each of the several strips of the several belts bearing characters showing successive increments of interest on successive days, means for moving said frames longitudinally to a definite starting position, means for moving said frames in the reverse direction, and means for automatically stopping the different frames at different distances of travel from said starting position, such distances being proportional to the different number of days in the several months involved.

3. In a machine of the character described, the combination of a series of endless belts, a corresponding series of longitudinally adjustable frames for mounting said belts, each of the several elements of the several belts bearing characters showing successive increments of interest on successive days, means for longitudinal relative adjustment of said frames at distances proportional to the number of days in the different months involved, a pair of strips corresponding to each of said belts, located adjacent and substantially parallel to the uppermost element of each of the endless belts, bearing thereon numerals designating the days of the month, and means for adjusting said strips longitudinally according to the number of days in the different months involved.

4. In a machine of the character described, the combination of a series of interest tables, showing successive increments of interest on successive days, a series of strips, located adjacent and substantially parallel to said interest tables, said strips being longitudinally adjustable with respect to said tables, a toothed rack, engaging with the ends of said strips, adapted to permit such longitudinal adjustment, a rotatable shaft, bearing on its periphery pins of a length proportional to the number of days in the different months, said pins being adapted to engage with said toothed rack to cause the above-mentioned longitudinal adjustment.

5. In a machine of the character described, the combination of a series of interest tables, showing successive increments of interest on successive days, a corresponding series of longitudinally adjustable frames for carrying said tables, a rotatable shaft, bearing a corresponding series of pins on its periphery, said pins being of a length proportional to the number of days in the different months involved, a pair of longitudinal strips for each of said tables, located adjacent and substantially parallel to its respective table, a toothed rack, engaging with the ends of each pair of strips adapted to permit longitudinal movement of each strip, a second rotatable shaft, bearing a series of pins for each rack on its periphery, said pins being of a length proportional to the number of the days in the different months, said pins being adapted to engage with said racks to give a longitudinal adjustment of said strips corresponding to the number of days in the different months involved, and geared connections between said first and second rotatable shafts, adapted to maintain a given set relationship between the two shafts.

6. In a machine of the character described, the combination of a series of interest tables, showing successive increments of interest on successive days, corresponding pairs of longitudinally adjustable strips bearing the numerals of the days of the month thereon, located beside said tables, a series of toothed racks, each rack engaging with the ends of a pair of strips, adapted to permit relative longitudinal adjustment between the different pairs of said strips, a rotatable shaft, bearing sets of pins for each of said racks, the different pins being of lengths proportional to the number of days in the different months involved, said pins being adapted to engage with said racks to adjust said strips longitudinally to positions dependent upon the number of days in the several months involved, means for moving said toothed racks to an initial starting position, and means to move said toothed racks in the reverse direction into engagement with the said pins on said rotatable shaft, to the above-mentioned adjusted positions.

7. In a machine of the character described, the combination of a series of longitudinally adjustable interest tables, showing successive increments of interest on successive days, a rotatable shaft, bearing a set of pins on its periphery for each of said tables, the lengths of said pins varying proportionally to the number of days in the different months, said pins being adapted to engage said tables, longitudinal strips, bearing numerals designating the days of the month, toothed racks engaging the ends of said strips, a second rotatable shaft, carrying a set of pins for each of said racks, proportioned as in said first-mentioned shaft, adapted to engage with said racks, geared connections between said two pin bearing shafts, means to move said interest tables to an initial starting position, means to move said toothed racks to an initial starting position, a locking device adapted to lock said two pin bearing shafts, adapted to be unlocked upon the movement of said tables to the starting position, and a second locking device, adapted to lock said two pin bearing shafts, adapted to be unlocked upon the movement of said toothed racks to the starting position.

8. In a machine of the character described, the combination of a rotatable shaft, bearing on its periphery the names of the months in horizontal and vertical rows, a series of longitudinally adjustable interest tables showing successive increments of interest on successive days, a second rotatable shaft, bearing pins on its periphery, of lengths proportional to the number of days in the different months, said pins being adapted to engage with said interest tables and set them in different longitudinal positions, longitudinally movable strips, bearing numerals showing the days of the month, engaging with toothed racks, permitting relative longitudinal adjustment, a third rotatable shaft, bearing pins as does said second shaft, said pins being adapted to engage with said racks to set the strips in different longitudinal positions, corresponding to the number of days in the months involved, geared connections between the three rotatable shafts, a blind, adapted to cover all the names of the months except that on the extreme left, and means to release said blind upon said toothed racks being moved to engage with the pins on said third shaft.

9. In a machine of the character described, the combination with a series of longitudinally-movable interest tables, of means for moving said tables in one direction to a definite starting position, means to move said tables in the reverse direction, and means to stop the travel of said tables when they have traversed distances in the reverse direction proportional to the periods of time involved by the several tables.

10. In a machine of the character described, the combination of a series of interest tables, corresponding to a series of months, bearing characters thereon showing successive increments of interest on successive days, means for moving said tables into different longitudinal relation with each other, such different longitudinal relation being dependent upon the number of days in the different months involved, a corresponding series of pairs of strips, each pair being located adjacent and substantially parallel to its respective interest table, means for adjusting the longitudinal relation between the strips of each pair, according to the number of days in the particular month involved, and means for longitudinally adjusting the pairs of strips with respect to said series of interest tables, according to the day of the month from which the interest is calculated.

11. In a machine of the character described, the combination with a series of interest tables corresponding to a series of months, of a corresponding series of pairs of strips, relatively-movable in a longitudinal direction, located adjacent to and substantially parallel with the said tables, said strips carrying numerals representing days of the month, whereby various amounts of interest may be read off on the interest tables, at points determined by the position of said numerals with respect to said tables, and means for adjusting the longitudinal relation between the strips of each pair, according to the length of the period of time involved with each pair of strips.

12. In a machine of the character described, the combination with a series of interest tables corresponding to a series of months, of a corresponding series of pairs of strips, relatively-movable in a longitudinal direction, located adjacent to and substantially parallel with the said tables, said strips carrying numerals representing days of the month, whereby various amounts of interest may be read off on the interest tables, at points determined by the position of said numerals with respect to said tables, means for adjusting the longitudinal relation between the strips of each pair, according to the length of the period of time involved with each pair of strips, and means to simultaneously move all of said strips longitudinally.

In testimony whereof I have affixed my signature in presence of two witnesses.

VICTOR BERNOVITS.

Witnesses:
JOHN J. RONTO,
HUGH KEMCUY.

Copies of this patent may be obtained for five cents each, by addressing the "Commissioner of Patents, Washington, D. C."